United States Patent
Edmunds

[15] 3,636,482
[45] Jan. 18, 1972

[54] MODULAR CIRCUIT BREAKERS AND PANELBOARDS WITH GROUND-FAULT PROTECTION

[72] Inventor: William Harold Edmunds, Valley Forge, Pa.

[73] Assignee: Federal Pacific Electric Company, Newark, N.J.

[22] Filed: May 25, 1970

[21] Appl. No.: 40,328

[52] U.S. Cl. ............................ 335/6, 200/5 B, 317/58, 317/112, 335/18
[51] Int. Cl. ........................................ H01h 83/20
[58] Field of Search ............... 317/58, 112; 335/6, 7, 18, 335/20, 27, 35, 36, 159, 160, 173; 200/5 A, 5 B

[56] References Cited

UNITED STATES PATENTS

| | | | |
|---|---|---|---|
| 3,369,202 | 2/1968 | Gryctko | 335/20 X |
| 3,440,579 | 4/1969 | Smith | 335/18 |
| 2,976,385 | 3/1961 | Edmunds | 317/112 |
| 3,069,517 | 12/1962 | Cole | 200/5 B |
| 3,256,407 | 6/1966 | Klein | 317/58 X |

Primary Examiner—A. D. Pellinen
Attorney—Paul S. Martin

[57] ABSTRACT

Modular circuit breaker units and modular ground-fault tripping units can be stacked separately and assembled to each other by the user as required. When the units are assembled, there is a mechanical coupling from the ground fault tripper to the release mechanism of the circuit breaker, and one terminal of the circuit breaker unit is connected to a terminal of the ground-fault tripping unit. That connection completes a series circuit that extends through both units from a line terminal on one of the units to a load terminal on the other unit. The ground-fault tripping unit also has "neutral" terminal and a second "load" terminal. The electrical connection and the trip-mechanism coupling between the units are established incidental to assembling the units, and the ground-fault tripping unit has a part that prevents use of one of the circuit breaker terminals from being used an an external circuit connection.

6 Claims, 6 Drawing Figures

PATENTED JAN 18 1972

3,636,482

INVENTOR
WILLIAM HAROLD EDMUNDS
BY
Paul S. Martin
ATTORNEY

MODULAR CIRCUIT BREAKERS AND PANELBOARDS WITH GROUND-FAULT PROTECTION

The present invention relates to modular circuit breakers and panelboards, equipped with modular ground-fault control.

There is a growing need and acceptance of circuit breakers equipped with ground-fault controls of the type having high sensitivity to ground faults, of the order of 5-milliampere ground leakage current. As a practical matter, certain circuits cannot or should not be tripped open even in case hazardous ground leakage current should develop. Other circuits in the same installation require such protection. The present invention makes possible the production of a single line of circuit breakers for both applications, with resulting economy to the producer and flexibility in the stocks of apparatus kept available for the contractor-user. The present invention makes possible the use of circuit breakers with and without ground-fault trippers in a common panelboard of the type providing modular circuit breaker mounting locations.

More particularly, this invention provides circuit breaker units that can be separately used and separately stocked and modular ground-fault responsive units that can also be stocked separately, such that a circuit breaker unit and a ground-fault tripping unit can be readily assembled by the user as required, from a supply of standardized circuit breakers.

Still further, safeguards are provided, for assuring energization of the ground-fault detection and tripping units whenever current is available to a load from an assembled breaker and ground-fault tripping device. Still further, means is provided for guarding against installation of such apparatus with inadvertent bypass of the ground-fault tripping sensor.

The nature of the invention, including its various novel features and their advantages will be more fully appreciated from the following detailed description of a presently preferred embodiment, which is shown in the annexed drawing.

Figure 1:
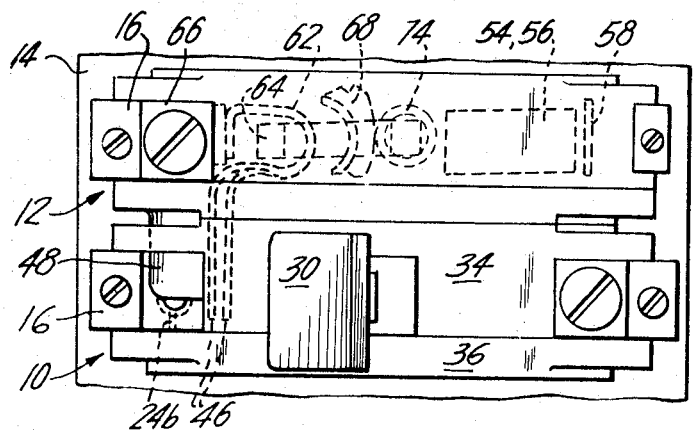
FIG. 1 is a fragmentary plan view of a panelboard including a coupled pair of modular units, i.e., a circuit breaker and a ground-fault responsive unit.

Referring now to the drawings, two modular units 10 and 12 are shown assembled to a base 14. Unit 10 is a circuit breaker having a conventional internal mechanism and unit 12 is a ground-fault responsive device coupled to unit 10. The modular units are held in assembly to each other and to a panel 14 by screw-and-clip retainers 16 that are disposed at modular locations on panel 14. While only two modular units are shown, it is to be understood that many more are assembled in modular placements in usual panelboards.

Circuit breaker 10 includes a pair of contacts 18 and 20 that are operable to make and break a circuit through the circuit breaker. This circuit extends from terminal 22, along bimetal 23, to a length of flexible copper braid 26, to contact arm 28 that carries contact 20, through contacts 18 and 20 to the opposite terminal 24. The operating mechanism includes a handle 30 which forms a fulcrum for the upper end of contact arm 28, and handle 30 itself has a pivot 32 in the two parts 34 and 36 of molded insulation which are held together by rivets 37 and which form the enclosure of the circuit breaker. Cradle 38 has a pivot 40 at its left end (as illustrated) and the right end of cradle 38 has a latching surface arrested by a detent 42 carried by a J-shaped leaf spring 44 whose upper end is fixed to bimetal 23. A tension coil spring 45 extends from contact arm 28 to cradle 38. Spring 45 biases the contacts into engagement with each other and also biases cradle 38 against its detent 42. In so doing, spring 45 also acts to bias handle 30 toward its "on" position. Handle 30 can be operated from the position illustrated toward the right in FIG. 2, causing contact arm 28 to move across the line connecting the extremities of spring 45, and after overcentering occurs the spring causes contact arm 28 to move to the open position with a snap motion. A reverse motion of handle 30 from its "off" position to the "on" position illustrated will restore the contacts 18, 20 to their closed position illustrated. In the event of an overcurrent through the circuit breaker, bimetal 23 heats up and deflects toward the right, carrying J-shaped spring 44 toward the right and thereby removing detent 42 from the path of cradle 38. This release causes the cradle to move clockwise about its pivot 40, carrying the upper end of spring 46 to the right. When the line of action of the spring crosses the upper pivot of contact arm 28, contact arm 28 is automatically driven in the opening direction. The circuit breaker thus far described is entirely conventional. It is only one illustrative form of various circuit breakers that can be employed for the purposes of the present invention.

Figure 2A:
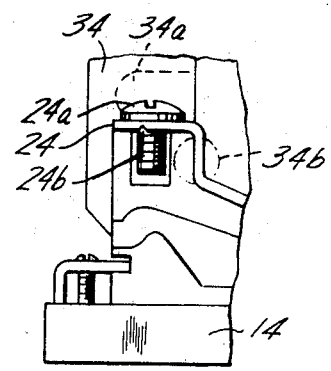
FIG. 2A is a lateral view of an end portion of the circuit breaker of FIG. 2 in its normal condition for use as a circuit breaker separate and apart from the ground-fault tripper.

In its normal condition, before assembly to unit 12, circuit breaker 10 has a construction at its left-hand end which is illustrated in FIG. 2A. The molded-case part 34 has two thin wall portions 34a and 34b whose outline is indicated by the broken lines in FIG. 2A. These thin wall portions are left intact when the circuit breaker is to be used as a conventional single-pole circuit breaker. Terminal 24 has a screw 24a for connection to a load wire.

Where circuit breaker 10 is to be used together with modular ground-fault tripping apparatus, screw 24a is removed. Terminal 24 has a groove or notch 24b in it (See also FIG. 1) which makes it possible for half of the external part of terminal 24 to be broken away so that this terminal can no longer be used for making connections. Casing portion 34b is removed and a plug-in contact 46 is inserted. This plug-in contact is part of the ground-fault tripping unit 12. An integral projection 48 of insulation extends from the sidewall of unit 12, through an opening left by removal of area 34a of the molded-case of circuit breaker 10, so as to over-lie terminal 24 directly. This necessitates removal of screw 24a before the ground-fault tripping module can be assembled to the circuit breaker illustrated. Thus, automatic assurance is provided that terminal 24 will be disabled as part of the circuit connections in the panelboard.

Figure 2:
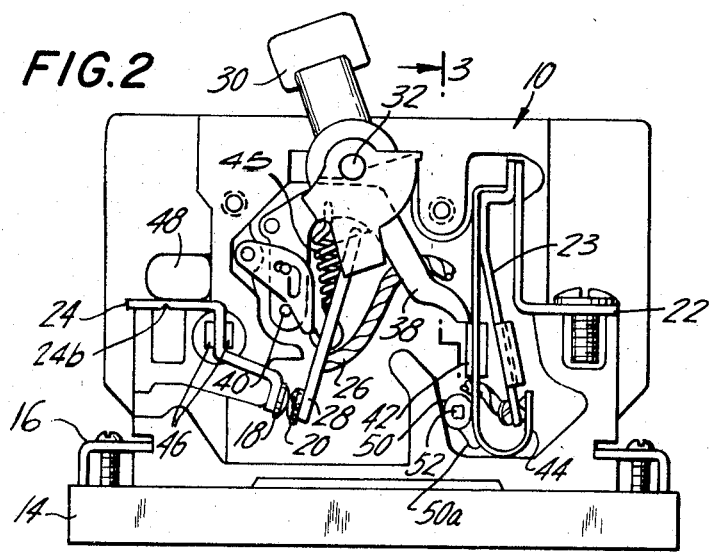
FIG. 2 is a side elevation of the circuit breaker of FIG. 1 with the side cover removed.
Figure 3:
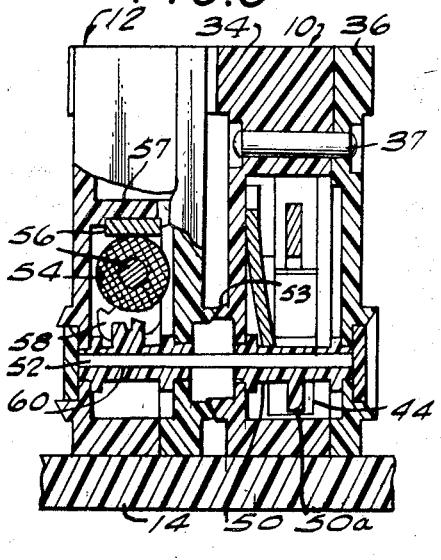
FIG. 3 is a cross section of the assembly in FIGS. 1 and 2 as viewed from the plane 3—3 in FIG. 2.

As seen in FIGS. 2 and 3, circuit breaker 10 includes a trip member 50 that is tubular and which is pivoted in the inside walls of the circuit breaker enclosure. A projection 50a normally rests against J-shaped member 44. Clockwise turning of member 50 (as viewed in FIG. 2) causes release of detent 42 and opening of the contacts in the manner described above in connection with the occurrence of an overcurrent. A square shaft 52 extends into member 50. Conical-ended alignment bosses 53 are included in members 10 and 12, concentric with the axis of square shaft 52. Counterclockwise rotation of shaft 52 and member 50 causes release of the circuit breaker and automatic opening of the contacts, thus interrupting the current path from terminal 22 to plug-in connection 46.

Unit 12 includes an electromagnet having a coil 54 and pole-pieces 56, secured within the casing of unit 12 on an insulating projection 57 that is integral with the insulating housing. The electromagnet includes an armature 58 carried by a member 60 which, like member 50, is journaled in the sidewalls of the casing of unit 12. Member 60 has a square passage therethrough which receives square shaft 52. It is evident that, when electromagnet 54, 56 is energized, armature 58 is attracted and trip member 50 causes automatic release of the contacts.

Figure 4:
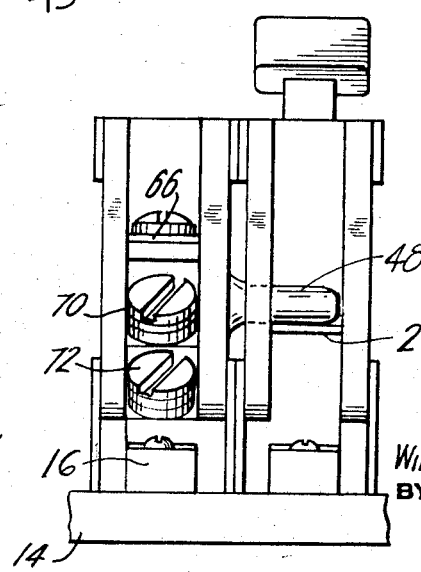
FIG. 4 is an end view from the left of the assembly in FIG. 1.

Plug-in contact 46 extends as a one-turn primary 62 around the core 64 of a differential current transformer. Winding 62 is electrically and mechanically united to terminal 66 of unit 12. Another one-turn primary 68 extends to load terminal 70 and neutral terminal 72 (FIG. 4). Each of windings 62 and 68 can have two, three or more turns, as desired. A secondary winding 74 has many turns 74. Winding 62 and 68 are so phased that their fluxes tend to balance in core 64 under normal conditions, and then there is no output at winding 74.

When units 10 and 12 as thus far described have been assembled, a circuit extends from terminal 22, through the circuit breaker to plug-in connection 46, and along winding 62 to load terminal 66 of unit 12. This connection and the rest of the current path are proportioned to carry at least the rated current of the circuit breaker.

Figure 5:
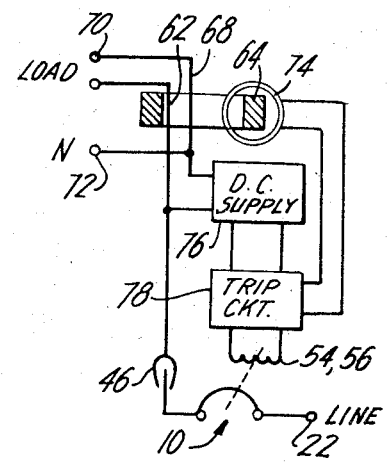
FIG. 5 is a wiring diagram of the apparatus in FIGS. 1–4.

The circuit of the ground-fault tripping unit 12 is shown in FIG. 5, in its relationship to the circuit breaker. This circuit may be any of the wide variety of well-known circuits for enabling electromagnet 54, 56 to trip the release mechanism of circuit breaker 10 in response to ground-fault current sensed by the differential current transformer. Thus, a direct current supply which may be simply a solid-state bridge rectifier 76 may be energized by connections to both of the primary windings 62 and 68, being connected across the two-wire alternating current supply line of the protected circuit. Trip circuit 78 which may be essentially an SCR is energized by the direct current supply and energizes trip coil 54, 56 when the output of secondary winding 74 reaches a prescribed threshold. The entire circuit of FIG. 5 except for plug-in contact 46 and circuit breaker unit 10 with its terminal 22 is contained within the enclosure of unit 12.

The electromagnet may be one that is constantly energized and when it is deenergized by its control circuit it is arranged to cause operation of the circuit breaker when the electromagnet moves to its deenergized configuration. Such a system is disclosed in my application Ser. No. 755,228 filed Aug. 26, 1968, and now U.S. Pat. No. 3,539,867. By like token, coil 54, 56 may be normally deenergized and it may be energized by a trip circuit 78 in response to a ground-fault current of predetermined hazardous level. The latter circuit is of the type shown in the U.S. Pat. No. 3,356,939 issued on Dec. 5, 1967 to R. A. Stevenson. In both cases there is no dependence on the electrical installer to make the connection between trip coil 56 and its control and energizing circuit. Complete assurance is had that, if current is available from line terminal 22, through the apparatus to terminal 66 and to the load, then current is also available to the tripping circuit in unit 12.

The two units 10 and 12 are assembled by moving one in a straight-line motion toward one the other, after casing portions 34a and 34b have been broken away and screw 24a is removed. Member 48 moves into position over terminal 24 in such a manner that there is no room for screw 24a. Consequently there is no danger of an electrician inadvertently connecting the load to terminal 24, bypassing the ground-fault detection unit. In the same straight-line assembly motion, plug-in contact 46 engages the terminal structure 24, and shaft 52 which extends from trip arm 60 of the electromagnet also slides into position in tripping member 50 of the circuit breaker. Members 16 secure modular units 10 and 12 in place side by side in prescribed panelboard spaces. The electromagnet of modular unit 12 and the load current path through both units are rendered operative. If the connection at plug-in contact 46 were defective (so as to disable the ground-fault trip circuit) then there would be no current path to load terminal 66. Conversely, so long as load terminal 66 is energized, there is assurance that connection is made to the circuit for energizing electromagnet 54, 56, as made and tested at the factory.

The securing elements 16 for this particular panelboard are purely illustrative as are the forms of terminals and the circuit breaker mechanism itself. Thus, circuit breakers and panelboards of the plug-in type may be used, as shown for example in U.S. Pat. No. 2,647,225.

The circuit breaker 10 itself, when in the form shown in FIG. 2A, is a product that can be made in quantity and in various ratings, and it may be used in panelboards as a conventional circuit breaker. Modular units 12 can be stocked in a standardized construction or in a very few standardized constructions, so as to be available for assembly to a circuit breaker 10 where a circuit protected by the circuit breaker also requires ground-fault protection. Relatively few sizes and limited quantities of ground-fault modular units need be made and stocked. The outline and thickness of modular units 12 are such that these units fit on a panelboard in the same spaces, individually, as individual circuit breakers; and when the parts of the plug-in electrical connection 24–46 and the mechanical coupling 50–52 are aligned and assembled, the mounting provisions of the panelboard that are effective to receive and secure the circuit breakers are also in the proper positions to secure the modular ground-fault units.

When used with a ground-fault unit, terminal 24 of a circuit breaker is used as shown. It is modified (so as to be disabled as a terminal for external load wiring connection) by removing screw 24a as shown in FIG. 2 and it can be modified further as a safeguard against tampering by breaking away an external portion of the terminal 24, using the weakening grooves 24b to facilitate such modification.

It is evident that numerous extension, modifications and arrangements of the foregoing devices may be made by those skilled in the art. For example, while terminal 22 is here used as a line or bus connection and terminal 66 is used as a load connection, these connections may be reversed; and similarly, the circuit breaker can be reversed so as to make terminal 22 selectively available for connection to a load wire or to a ground-fault unit, terminal 24 then becoming a line or bus terminal. In view of the varied applications of the foregoing that will be obvious to those skilled in the art, the invention should be construed broadly in accordance with its spirit and scope.

What is claimed is:

1. A ground-fault interrupter, including a molded-case circuit breaker forming a first individually complete modular unit having an enclosure and having, in assembly with said enclosure, line and load terminals, a separable pair of contacts, manual contact closing and opening mechanism including a current-responsive release for effecting automatic opening of the contacts in response to an overcurrent, a ground-fault responsive device forming a second individually complete modular unit having a second enclosure and having, in assembly with said second enclosure, ground-fault sensing means, a tripping electromagnet and energizing means for said electromagnet responsive to said ground-fault sensing means, said first and second modular units being assembled and having a mechanical coupling between said tripping electromagnet and the current-responsive release of said circuit breaker, said second modular unit including load-current-carrying means linked to said ground-fault sensing means and connected in series with said circuit breaker.

2. A ground-fault interrupter in accordance with claim 1, wherein said second modular unit includes a pair of terminals for said load-current-carrying means, one of said terminals of said circuit breaker and one of said terminals of said ground-fault responsive device being juxtaposed and connected to each other when said first and second modular units are assembled.

3. A ground-fault current interrupter in accordance with claim 2, wherein said juxtaposed terminals are of the plug-in type disposed for plug-in assembly incidental to bringing said modular units into mutual assembly.

4. A ground-fault current interrupter in accordance with claim 2, wherein at least part of said one of said terminals of the circuit breaker is disabled from normal service as an external circuit connector.

5. A ground-fault interrupter in accordance with claim 1, wherein a part of said second modular unit extends into proximity to one of said circuit-breaker terminals to obstruct making an external circuit connection thereto.

6. A ground-fault interrupter in accordance with claim 5 wherein said second modular unit includes a pair of terminals for said load-current-carrying means, one of said terminals of said circuit breaker and one of said terminals of said ground-fault responsive means being of the plug-in type located on the respective modular units so as to become interconnected incidental to bringing said modular units into mutual assembly.